Nov. 16, 1965        P. BOWERS ETAL        3,218,097
CONNECTION MEANS FOR TUBULAR FRAMEWORKS
Filed March 1, 1963                              2 Sheets-Sheet 1

Inventors
Peter Bowers,
Anthony C.B. Brown
by Sommers & Young
Attorneys

United States Patent Office 3,218,097
Patented Nov. 16, 1965

3,218,097
CONNECTION MEANS FOR TUBULAR FRAMEWORKS
Peter Bowers and Antony Charles Barrington Brown, Middlesex, England, assignors to Dexion Limited, Wembley Park, Middlesex, England
Filed Mar. 1, 1963, Ser. No. 262,044
Claims priority, application Great Britain, Mar. 5, 1962, Ser. No. 8,421/62
3 Claims. (Cl. 287—54)

This invention concerns improvements relating to connection means for use in frameworks composed of tubular members, used either alone in open frameworks or in conjunction with panels in closed or covered frameworks. Such frameworks are employed, for example, for storage purposes, display units, exhibition stands, furniture, shelving and so forth.

The invention seeks to provide a simple means of making rigid and effective connections quickly between members, for example vertical and horizontal tubular members, where they meet or intersect at a corner, without the necessity for using nuts and bolts, welding or the like or for preparing the members in any special way other than cutting them to the required lengths. A further object is to provide a means of connection which gives a structure of good appearance without the necessity for painting or similar finishing after assembly.

According to the invention, a connection means for the purpose set forth comprises a connection piece which has at least one arm tapering towards the free end, and at least one insert which is adapted for being pushed into the open end of a tubular member and which has itself a tapering opening for the insertion of the said arm with an interference fit and is adapted for being expanded by the inserted arm into tight engagement with the said tubular member.

Advantageously, the connection piece is made in at least two parts divided on a plane which passes through the longitudinal axis or axes of one or more arms. The external cross-sectional shape of the inserts may be round or non-round, preferably square, depending upon the shape of the tubular members. The arm and the opening in the insert, however, are preferably of square cross-sectional shape. Advantageously, the insert has pad portions at each end divided radially, for example at the corners of the square, so as to be readily expansible into contact with the inside of the tubular member when the arm is forced into the insert.

Figure 1:
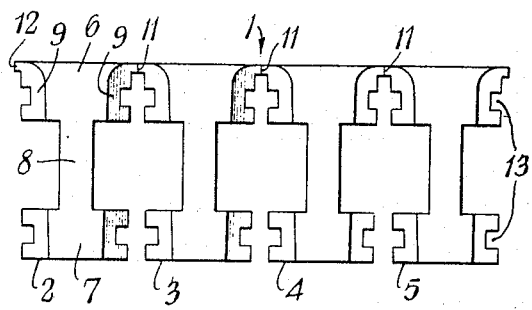
Figure 2:
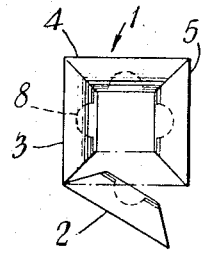
Figure 3:
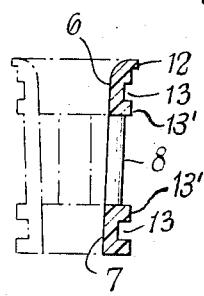
Figure 8:
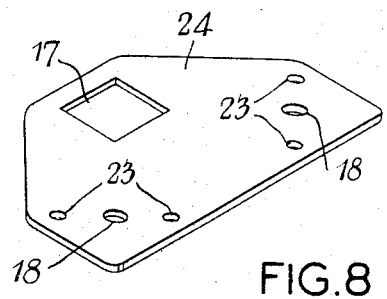
Figure 7:
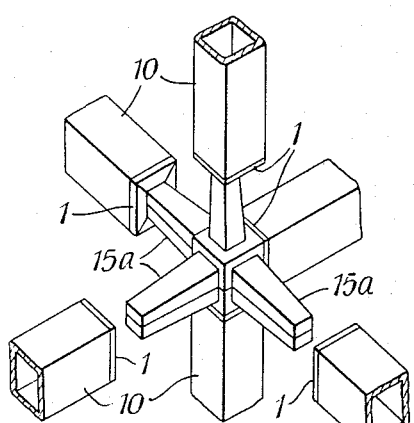
Figure 6:
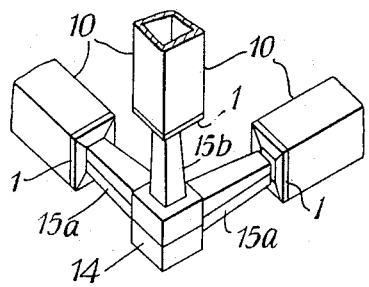
Figures 4, 5:
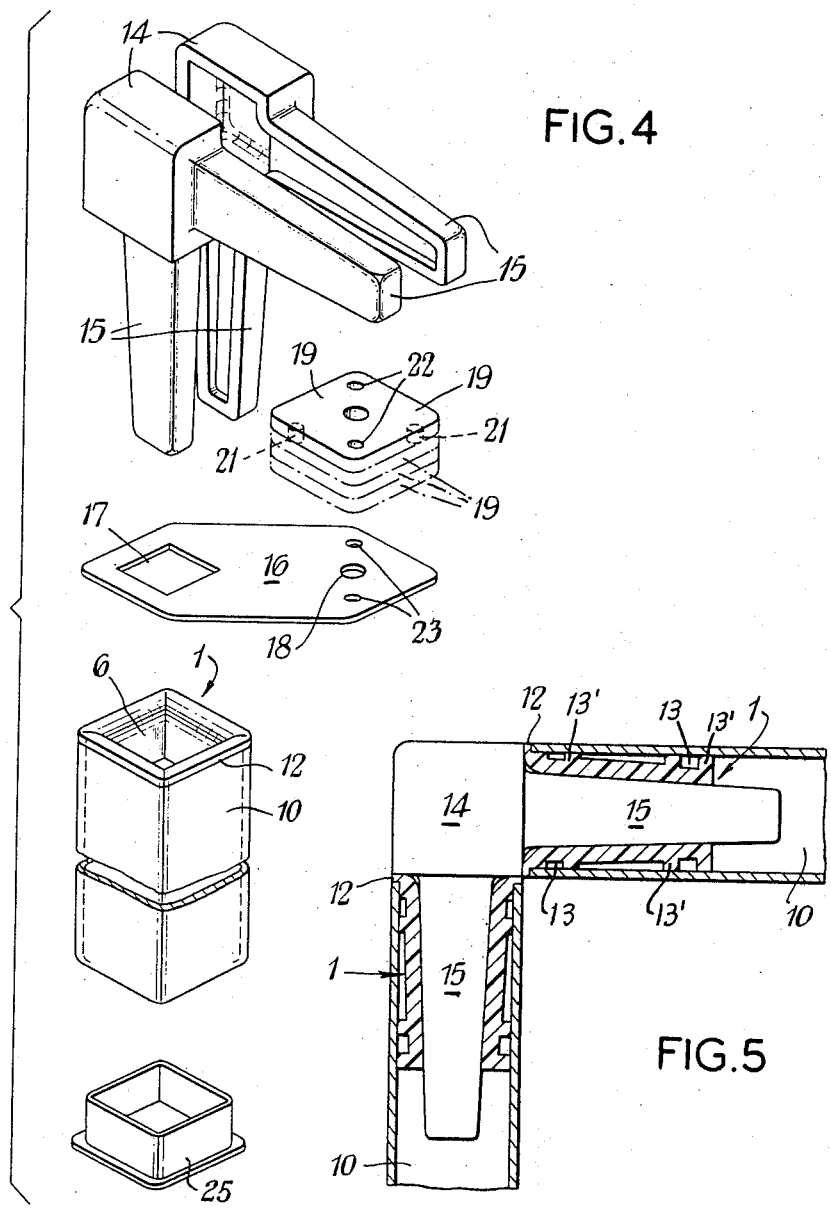

Ways of carrying the invention into effect will now be more fully described by way of example and with reference to the accompanying drawings, in which:

FIGURE 1 is an elevational view of an insert in a flat form and as seen from what will be the inside when the insert is in use, FIGURE 2 a plan view of the insert, illustrating how it is brought to the form in which it is inserted, FIGURE 3 a vertical section through the insert, FIGURE 4 an exploded perspective view of a connection piece, a tubular framework member with insert, and other parts, FIGURE 5 a sectional view through one form of connection, FIGURES 6 and 7 perspective views to a smaller scale showing examples of other forms of connection, and FIGURE 8 a perspective view of a shelf-supporting plate.

FIGURES 1 to 3 illustrate a collet-like insert 1 intended for use with tubular framework members of square cross section such as are shown in FIGURES 4 to 7. It comprises four similar sections 2, 3, 4, 5 each of which comprises outer and inner pad portions 6, 7 of roughly square shape in elevation and a thinner, flexible, intermediate portion 8 having, for example and as shown, a slender semi-circular cross section. The pad portions 6, 7 are mitred at 9 so that, they can be brought or assembled to the square shape shown in FIGURE 2 and fitted easily into the end of a tubular member 10, as shown in FIGURES 4 and 5. Preferably, the insert is moulded from a synthetic plastic material and thin flexible connecting webs are left at 11 as hinges, so that the insert can readily be brought from the flat form shown in FIGURE 1 to the square form shown in FIGURE 2 and can be conveniently inserted as a single unit. However, an insert consisting of separate sections could be used and such sections might be made as die castings. At the outer end of the insert, the sections 2 and 5 have narrow flanges 12 on the outside designed to lodge upon the end edges of the tubular member 10 and to be flush with outer faces of the said member.

The pad portions 6 and 7 are not identical. The inner pad portion 7 is thicker (FIGURE 3) and its face narrower (FIGURE 1) than the pad portion 6. Consequently, when the insert is in the square form in which it is used, the faces of the pad portions 6, 7 bound a tapering cavity (FIGURE 3) of the shape of a frustum of a square pyramid passing through the insert. The outsides of the pad portions 6 and 7 are formed with transverse grooves 13 providing projecing formations 13′ adjacent thereto.

As an alternative for the form of insert just described, use may be made of an insert in which the pad portions are connected by a thin-walled intermediate portion of tapering sleeve shape. The pad portions at each end are divided from each other at the corners by radial cuts which extend a short way into the intermediate portion.

For connecting tubular members 10 with the assistance of such inserts, use is made of connection pieces each of which comprises a body 14 of cubical shape with two arms 15 projecting at right angles from two faces of the said body, as shown for example in FIGURES 4 and 5, or with more than two arms as hereinafter described. Each arm 15 is of frusto-pyramidal shape complementary to that of the aforesaid cavity through the insert.

To make a connection between tubular members 10, an insert 1 is pushed into the end of one such member, for which purpose only light finger pressure is required. The flanges 12 prevent the insert from entering too far or dropping into the tubular member. The connection piece then has the appropriate arm 15 inserted into the cavity in the insert 1. The arm 15 and the cavity have the same apex angle, but the dimensions are so chosen that interference occurs between the arm and the pad portions 6, 7 of the insert 1 before the arm has fully entered the insert and member 10, suitably when the face of the body 14 is at approximately ⅜ inch from the outer end of the insert. This may be done by pushing the insert 1, assembled in the member 10, on to the arm 15 by hand as far as it will go, the arm being then forced completely home by, say, light blows from a soft-faced mallet. This final forcing of the pyramidal arm 15 into the cavity in the insert 1 causes the pad portions 6, 7 to be expanded radially outwards and to exert pressure against the inside of the wall of the tubular member 10. The pyramid-apex angle is selected to ensure that the forces developed are sufficient to lock the arm 15 securely in the member 10, account being taken of the possible dimensional variations, particularly of the inserts 1 and arms 15, to be tolerated. Suitably the angle may be less than 5°, for example about 3½°. The other member 10 is similarly dealt with. The forces developed are sufficient to hold the parts together and an extremely rigid framework structure with a good appearance can be obtained with connections thus produced. If required, moreover, a framework can be dismantled readily and with no damage to the components without the use of more than a mallet.

For connections between more than two tubular members 10, connection pieces may be used with arms 15 projecting, at right angles to each other, from any three, four, five or six faces of the body 14. Furthermore, a connection piece may have only one such arm 15, in which case the body 14 would be provided also with some other form of provision for connection or attachment purposes, such as a screw or dowel or a tapped or untapped hole.

The connection pieces are suitably die castings and are advantageously made in two halves, as shown for instance in FIGURE 4, so that they can be made hollow, thus reducing weight and cost. In the case of a connection piece with two, three or four arms 15 whose axes lie in one plane, the casting is divided on this plane. The arms themselves are then each divided. However, one or two arms 15 of a connection-piece, not lying in the said plane, may be undivided. A possible advantage of the use of divided connection pieces is that each of seven different connection pieces can be assembled from pairs of castings selected from only five different castings. These five castings comprise half bodies with two, three and four half arms in one plane, a half body with two half arms at right angles and a whole arm at right angles to each of the half arms, and a half body with four half arms at right angles and a whole arm at right angles to each of the half arms. The hole through each arm may be of square or circular cross section and closed or open at the end.

Two examples of connection pieces with more than two arms are shown in FIGURES 6 and 7. The three-armed connection piece shown in FIGURE 6 is divided on the mean plane of the arms 15a. The other arm 15b is undivided. The six-armed connection piece shown in FIGURE 7 is divided on the mean plane of the arms 15a (one of which is not seen). The other arms 15b (one of which is not seen) are undivided.

Some examples of simple auxiliary devices which can be used in structures comprising tubular members, connection pieces and inserts such as have been described above are shown in FIGURE 4. If a shelf is to be supported, a simple shelf-supporting metal plate 16 with a square hole 17 is assembled on an arm 15, before insertion in the insert 1 and upright tubular member 10, so that it will project diagonally under the adjacent corner of the shelf. When the connection piece is forced home, the plate 16 is held securely between the adjacent face of the body 14 and the end of the insert 1. Shelf panels of all kinds can then simply be dropped into the framework. However, a shelf panel may be fixed to the plate 16 by means of a bolt passed through a hole 18. If it is required that a thin shelf panel should be flush with the upper faces of adjacent horizontal tubular members 10, a selected number of resilient plastic spacers 19 may be interposed between the plate 16 and the underside of the shelf panel. In addition to a bolt hole 20 corresponding to the hole 18, each spacer has two pegs 21 formed on its under side on one diagonal of its square shape and two holes 22 pierced through it on the other diagonal. These pegs 21 and holes 22 allow the required number of spacers 19 to be firmly interengaged. The plate 16 also has holes 23 for receiving the pegs of the lowest spacer 19. If it is required to support a shelf or shelves on two sides of a vertical member, use may be made of the double plate 24 shown in FIGURE 8.

A flanged plastic cap 25 is shown at the lower end of the tubular member 10 in FIGURE 4, where it would be inserted to serve as a foot. Such a cap could also be used to close any end of a tubular member left open in a structure. It may be of domed or shallow pyramidal form on the under side. Plastic bodies may also be inserted in the ends of the members 10 for other purposes, for example as mountings for adjustable screw feet, casters or the like.

In the example described above, the tubular members 10 are of square cross section, which gives a neat strong construction. A suitable tube is 1 inch square welded tube made of mild steel 0.048 inch thick and stove enamelled. Standard lengths of such tube can be readily cut to requirements. However, tubular members of other polygonal cross section or of circular cross section can be used. In the latter case, the insertion will have an external circular shape fitting snugly into the end of the tubular member. If desired, the same connection pieces can be used with both square-section and circular-section tubular members and/or with tubular members of different sizes. Only the external shape of the inserts need be different for the different types of tubular member. Accordingly, if required, members of square and circular section can be used in one and the same framework structure.

We claim:

1. Connection means for tubular framework of substantially square cross section, comprising, at least two tubular members of square cross section, a connection piece consisting of a body and at least two tapering arms of substantially square cross section extending therefrom, and a flexible insert of hollow, substantially square, cross section located in the open end of each one of said tubular members, each of said inserts comprising an outer and an inner pad portion connected with each other by an intermediate connecting portion which is of less width than and more flexible than said pad portions, said intermediate connection portions being separate from each other, said pad portions having outwardly projecting formations on their external faces to make surface contact with the corresponding internal faces of the said tubular member when the said insert is expanded by the said insert arm into tight engagement with the said tubular member, and means on one of the external faces to engage the end face of the tube to prevent inward movement of said insert.

2. Connection means as claimed in claim 1, wherein the outer pad portions of the said square section insert are provided with interconnecting light hinge means so that the said insert can readily be brought from a flat form in which it is more readily manufactured to the square form in which it is used in said tubular members.

3. Connection means as claimed in claim 1 and in which inside edge portions of said pads at the outer end portions of said inserts are mitered adjacent each other so as to facilitate folding the inserts into square cross sectional shape.

References Cited by the Examiner

UNITED STATES PATENTS

| | | | |
|---|---|---|---|
| 1,175,283 | 3/1916 | March | 285—323 X |
| 1,817,774 | 8/1931 | Sipe | 287—126 X |
| 2,042,007 | 5/1936 | Kennedy | 46—29 |
| 2,088,955 | 8/1937 | Hamill | 85—77 |
| 2,529,821 | 11/1950 | Snider | 285—334.1 X |
| 2,616,736 | 11/1952 | Smith | 285—231 X |
| 2,709,318 | 5/1955 | Benjamin | 46—29 |
| 2,785,453 | 3/1957 | Wentz | 285—231 |
| 2,926,941 | 3/1960 | Thompson. | |

FOREIGN PATENTS

| | | |
|---|---|---|
| 1,119,740 | 4/1956 | France. |

CARL W. TOMLIN, *Primary Examiner.*